(12) United States Patent
Reisacher et al.

(10) Patent No.: US 6,334,892 B1
(45) Date of Patent: Jan. 1, 2002

(54) TUNGSTEN NICKEL-ANTIMONY-RUTILE MIXED-PHASE PIGMENTS

(75) Inventors: Hansulrich Reisacher, Maxdorf; Uwe Mauthe, Mannheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/635,130

(22) Filed: Aug. 9, 2000

(30) Foreign Application Priority Data

Aug. 26, 1999 (DE) .......................................... 199 40 413

(51) Int. Cl.[7] .................. C01G 23/04; C01G 30/00; C01G 41/02; C01G 53/04; C09C 1/36
(52) U.S. Cl. .................. 106/439; 106/440; 106/441
(58) Field of Search ................................ 106/439, 440, 106/441

(56) References Cited

U.S. PATENT DOCUMENTS

| 2,257,278 A | 9/1941 | Schaumann | 106/300 |
|---|---|---|---|
| 3,956,007 A | 5/1976 | Modly | 106/300 |
| 4,450,012 A | 5/1984 | Messer et al. | 106/300 |
| 4,917,735 A | 4/1990 | Rademachers et al. | 106/428 |
| 5,759,256 A | 6/1998 | Stramel | 106/439 |
| 6,036,763 A | * 3/2000 | Edwards et al. | 106/436 |

FOREIGN PATENT DOCUMENTS

| DE | 1 287 236 | | 1/1969 |
|---|---|---|---|
| DE | 27 14 654 | | 10/1978 |
| DE | 29 36 746 | | 3/1981 |
| EP | 0 075 197 | | 3/1983 |
| EP | 0 325 987 | | 8/1989 |
| GB | 877734 | | 9/1961 |
| JP | 60110763 A | * | 6/1985 |
| JP | 01095163 A | * | 4/1989 |

OTHER PUBLICATIONS

"Pigments, Inorganic", Ullmann's Encyclopedia of Industrial Chemistry, 5th Edition, vol. A20, 1992, pp. 307–308.

* cited by examiner

Primary Examiner—C. Melissa Koslow
(74) Attorney, Agent, or Firm—Oblon, Spivak, McClelland, Maier & Neustadt, P.C.

(57) ABSTRACT

Tungsten nickel-antimony-rutile mixed-phase pigments in which the nickel/tungsten molar ratio is $\geq 4$ are used to color plastics, coating materials, printing inks and ceramic glazes.

5 Claims, No Drawings

TUNGSTEN NICKEL-ANTIMONY-RUTILE MIXED-PHASE PIGMENTS

The present invention relates to novel tungsten nickel-antimony-rutile mixed-phase pigments in which the nickel/tungsten molar ratio is $\geq 4$.

The invention further relates to the preparation of these pigments and to their use for coloring plastics, coating materials, printing inks and ceramic glazes.

Rutile mixed-phase pigments have been known for a long time. They are understood as color pigments obtained by the incorporation of colored transition metal cations into the crystal lattice of the rutile. The metal cations incorporated as the guest component into the rutile host lattice are primarily those whose cationic radius is comparable in order of size with that of the titanium(IV). If the oxidation number of the colored cation differs from that of the titanium(IV), then the valences are balanced statistically by the incorporation of a further cation having a different—higher or lower, as appropriate—oxidation number. The mixed-phase pigments may additionally include lithium fluoride or sodium fluoride, which are frequently used as fluxes (mineralizers) in the preparation of the pigments by calcining.

Great technical significance has been acquired in particular by nickel and chromium-rutile mixed-phase pigments which in addition to nickel(II) or chromium(III), respectively, also include antimony(V) (nickel rutile yellow and chromium rutile yellow; cf. Ullmann's Encyclopedia of Industrial Chemistry, 5th Ed., Vol. A20, 307–308 (1992); U.S. Pat. No. 2,257,278). In addition to these two important rutile mixed-phase pigments, a large number of mixed phases containing further metal cations have been described. U.S. Pat. No. 3,956,007, for example, discloses antimony-free nickel-tungsten-rutile mixed phases additionally containing zinc, cerium, magnesium or lithium. DE-A-12 87 236 describes nickel rutile mixed phases into which tungsten (VI), tungsten(VI) and sodium fluoride, tungsten(VI), antimony(V) and sodium fluoride, and, respectively, tungsten(VI), antimony(V), copper(II) and sodium fluoride have been incorporated. The nickel/tungsten molar ration of the nickel-rutile mixed phases containing both tungsten and antimony is, however, only 1.67, and the color strength of these pigments is no different from that of analogous pigments containing no tungsten.

The known nickel-rutile mixed-phase pigments are not always satisfactory. In particular, there has been a need for stronger yellow pigments.

It is an object of the present invention to remedy this deficiency and to provide nickel-rutile mixed-phase pigments having advantageous performance properties, including in particular a high color strength.

We have found that this object is achieved by means of tungsten nickel-antimony-rutile mixed-phase pigments in which the nickel/tungsten molar ratio is $\geq 4$.

We have also found a process for preparing these tungsten nickel-antimony-rutile mixed-phase pigments, which comprises intimately mixing the oxides or oxide hydrates of titanium, nickel, antimony and tungsten, or salts of these metals which are convertible to the oxides, and calcining the resulting mixture under an oxidizing atmosphere at from 900 to 1200° C.

We have also found that these tungsten nickel-antimony-rutile mixed-phase pigments can be used to color plastics, coating materials, printing inks and ceramic glazes.

The rutile mixed-phase pigments of the invention comprising the triple system of titanium, nickel and antimony contain tungsten oxide as an essential further component.

The nickel/tungsten molar ratio is $\geq 4$, preferably from 4 to 150, with particular preference from 5 to 100, and with very particular preference from 6 to 70.

The rutile mixed-phase pigments of the invention preferably have a composition of from 65 to 90% by weight titanium dioxide, from 2 to 7% by weight nickel(II) oxide, from 7 to 25% by weight of antimony(V) oxide and from 0.05 to 4% by weight of tungsten(VI) oxide.

The rutile mixed-phase pigments of the invention are notable for advantageous coloristic properties, especially their high color strength and their bright yellow shade (color angle hue from 94 to 980°, chroma C*>60, especially $\geq 63$). Further advantageous performance properties are the good fastness properties, among which mention shall be made in particular of the high thermal stability, chemical resistance and weather fastness.

The rutile mixed-phase pigments of the invention are obtainable by the process which is likewise in accordance with the invention, by intimate mixing of the metal oxides or metal oxide hydrates, or metal salts which are convertible to the oxides, followed by calcining.

Appropriate metal salts which yield the desired oxides on calcining are, for example, carbonates, sulfates, chlorides, nitrates and hydroxides.

Specifically, the following preferred starting compounds may be mentioned by way of example:

$TiO_2$ in the rutile and anatase modifications, preferably not surface-treated, with a BET surface area of preferably from 2 to 20 $m^2/g$, and also titanium oxide hydrates such as metatitanic acid $H_2TiO_3$ and titanic acid $H_4TiO_4$;

nickel(II) carbonate, nickel(II) sulfate, nickel(II) chloride, nickel(II) nitrate and nickel(II) hydroxide;

antimony(III) oxide, whose BET surface area is preferably from 1 to 5 $m^2/g$ and which during calcining is oxidized to antimony (V) oxide;

tungstic acid $H_2WO_4$ or $WO_3$ $H_2O$, and tungsten(VI) oxide.

The first step of the process of the invention is to intimately mix all of the chosen starting compounds, which can be done either wet or, in particular, dry.

Alternatively, the mixture of the starting compounds can be prepared by coprecipitating the hydroxides and/or carbonates from aqueous solutions of soluble salts of the metals, and filtering off and drying the resulting precipitate.

The second step of the process of the invention, the calcining, is performed under oxidizing conditions at from 900 to 1200° C. The oxidizing atmosphere can be maintained by introducing oxidizing agents such as air or nitric acid into the oven. Calcining usually lasts for from 0.5 to 10 h, in particular from 0.5 to 2 h.

The cooled product of calcination is judiciously subjected to a step of comminution, preference being given to wet grinding, especially in aqueous suspension. The suspension obtained in wet grinding is subsequently dried. For drying it is possible, inter alia, to use a spray dryer, which normally gives granules comprising predominantly spherical pigment particles with a size of from about 5 to 3000 $\mu m$.

The rutile mixed-phase pigments of the invention can of course also undergo an aftertreatment customary for such pigments, using alkalis, or coating with metal oxides (e.g., DE-A-27 14 654, DE-A-29 36 746, EP-A-75 197).

The rutile mixed-phase pigments of the invention can be used advantageously for coloring plastics, coating materials, printing inks and ceramic glazes. In these utilities they are notable for high thermal stability, good chemical resistance and weather fastness, and, in particular, for the great strength and cleanness of their color.

EXAMPLES

Preparation and use of rutile mixed-phase pigments according to the invention

In order to asses their coloristic properties, the rutile mixed-phase pigments obtained were incorporated into PVC, an alkyd-melamine stoving enamel, or poly (acrylonitrile-butadiene-styrene) (ABS). Subsequently, the CIELAB values (color angle hue, chroma C*, luminance L) were measured with a Zeiss RFC 16 spectrophotometer using the standard illuminant D65. The color strength (indication of the coloring equivalents FAE) was then determined from the white reduction of the respective colored specimen. The colored specimen or colored coating, which contained in each case the same pigment but prepared without the addition of tungstic acid, was assigned an FAE value of 100 (standard). FAE values <100 denote a higher color strength than the standard, FAE values >100, accordingly, a lower color strength.

The colored PVC specimen was prepared as follows: a mixture of 3.5 g of PVC paste (Falcosol® K-ST 6101, from Follan, Minden) and 1.0 g of the respective pigment was fully ground on a paint grinder (from Engelsmann) with 2×50 revolutions under a load of 50 kg, drawn down onto a glass plate in a film thickness of 400 $\mu$m, and baked at 160° C. for 15 minutes. The white-reduced colored PVC specimen was produced similarly from 3.5 g of PVC paste, 0.8 g of titanium dioxide 2056 (from Kronos) and 0.4 g of the respective pigment.

The colored coating material was prepared as follows: a mixture of 24 g of alkyd-melamine stoving enamel (50% by weight solids content) and 6 g of the respective pigment was shaken on a Skandex apparatus with 80 g of glass beads (diameter 2 mm) for 30 minutes then drawn down in a wet-film thickness of 150 $\mu$m onto Chromolux card using an Erichsen type 238 II film drawing apparatus, and after the paint had been left to evaporate for 10 minutes the card was baked at 120° C. for 30 minutes.

The white-reduced coating material was prepared analogously from 24 g of alkyd-melamine stoving enamel, 3 g of titanium dioxide and 3 g of the respective pigment.

The colored, white-reduced ABS injection molding was produced as follows: a mixture of 98% by weight ABS, 1% by weight titanium dioxide and 2% by weight of the respective pigment was extruded at 240° C. and injected into a mold (length 60 mm, width 45 mm, height 2 mm).

The pigment prepared without the addition of tungstic acid had the following CIELAB values in the individual application media (in ABS, 2:1 by weight blend with titanium dioxide):

PVC: H=91.8°; C*=61.2; L=81.4;
alkyd-melamine enamel: H=96.5°; C*=61.5; L=88.1;
ABS: H=98.2°; C*=39.6; L=86.9.

Example 1

40 g of metatitanic acid (80% by weight TiO$_2$), 6.4 g of antimony trioxide, 3.2 g of nickel carbonate and 1.04 g of tungstic acid (67% by weight tungsten) were intimately mixed. The resulting mixture was subsequently calcined in an electrically heated chamber kiln at 1150° C. for 120 minutes.

30 g of the relatively soft calcination product obtained after cooling were admixed with 60 g of water and then ground in a centrifugal mill (300 ml grinding volume) using 250 g of glass beads (diameter 1 mm) for 25 minutes. After the glass beads had been separated off, the ground material was washed with water and dried at 120° C.

The resulting bright yellow pigment had the following color values in PVC: dH=1.7; dC*=3.2; dL=1.2; FAE=86.

Example 2

The procedure of Example 1 was repeated but using 0.25 g of tungstic acid.

The resulting bright yellow pigment had the following color values in PVC: dH=2.1; dC*=−0.5; dL=1.0; FAE=91.

Example 3

The procedure of Example 1 was repeated but using 0.52 g of tungstic acid.

The resulting bright yellow pigment had the following color values in PVC: dH=2.3; dC*=2.3; dL=1.2; FAE=88.

Example 4

The procedure of Example 1 was repeated but using 0.74 g of tungstic acid.

The resulting bright yellow pigment had the following color values in PVC: dH=1.2; dC*=4.6; dL=1.0; FAE=90.

Example 5

The procedure of Example 1 was repeated but using 1.48 g of tungstic acid.

The resulting bright yellow pigment had the following color values in PVC: dH=−0.5; dC*=4.9; dL=−1.5; FAE=92.

Example 6

100 kg of metatitanic acid (80% by weight TiO$_2$), 16.4 kg of antimony trioxide, 7.8 kg of nickel carbonate and 1.3 kg of tungstic acid (67% tungsten) were intimately mixed. The resulting mixture was subsequently calcined in a rotary tube furnace at 1150° C. with a throughput of 6.5 kg/h, while passing air in (1 m$^3$/h).

The calcination product was ground as in Example 1.

The resulting bright yellow pigment had the following color values:

PVC: dH=2.4; dC*=3.9; dL=2.5; FAE=86; alkyd-melamine enamel: dH=−1.1; dC*=3.4; dL=−2.3; FAE=86;

ABS: dH=−0.4; dc*=1.6; dL=1.4; FAE=88.

We claim:

1. A tungsten nickel-antimony-rutile mixed-phase pigment in which the nickel/tungsten molar ratio is ≧4, and which comprises from 65 to 90% by weight of titanium dioxide, from 2 to 7% by weight nickel (II) oxide, from 7 to 25% by weight of antimony (V) oxide and from 0.05 to 4% by weight of tungsten (VI) oxide.

2. A tungsten nickel-antimony-rutile mixed-phase pigment as claimed in claim 1, in which the nickel/tungsten molar ratio is from 4 to 150.

3. A process for preparing a tungsten nickel-antimony-rutile mixed-phase pigment as claimed in claim 1, which comprises intimately mixing the oxides or oxide hydrates of titanium, nickel, antimony and tungsten, or salts of these metals which are convertible to the oxides, and calcining the resulting mixture under an oxidizing atmosphere at from 900 to 1200° C.

4. A process as claimed in claim 3, wherein the calcination product is subjected to dry grinding or to wet grinding with subsequent drying.

5. A method of coloring plastics, coating materials, printing inks and ceramic glazes, which comprises incorporating a tungsten nickel-antimony-rutile mixed-phase pigment as claimed in claim 1 into said plastics, coating materials, printing inks and ceramic glazes.

* * * * *